(12) United States Patent
Stefancich (10) Patent No.: US 12,297,554 B2
(45) Date of Patent: May 13, 2025

(54) REAL TIME, CLOSED LOOP FEEDBACK JET-BASED LOCALIZED ELECTROFORMING METHOD AND SYSTEM

(71) Applicant: ATHENA TECHNOLOGIES, Rotterdam (NL)

(72) Inventor: Marco Stefancich, Delft (NL)

(73) Assignee: Athena Technologies, Rotterdam (NL)

( * ) Notice: Subject to any disclaimer, the term of this patent is extended or adjusted under 35 U.S.C. 154(b) by 461 days.

(21) Appl. No.: 17/631,146

(22) PCT Filed: Jul. 29, 2020

(86) PCT No.: PCT/IB2020/057129
§ 371 (c)(1),
(2) Date: Jan. 28, 2022

(87) PCT Pub. No.: WO2021/019449
PCT Pub. Date: Feb. 4, 2021

(65) Prior Publication Data
US 2022/0267919 A1 Aug. 25, 2022

(30) Foreign Application Priority Data

Aug. 1, 2019 (IT) .................. 102019000013626

(51) Int. Cl.
*C25D 1/00* (2006.01)
*B33Y 10/00* (2015.01)
*B33Y 30/00* (2015.01)

(52) U.S. Cl.
CPC .............. *C25D 1/003* (2013.01); *B33Y 10/00* (2014.12); *B33Y 30/00* (2014.12)

(58) Field of Classification Search
None
See application file for complete search history.

(56) References Cited

U.S. PATENT DOCUMENTS

| | | |
|---|---|---|
| 3,810,829 A | 5/1974 | Fletcher et al. |
| 4,497,692 A | 2/1985 | Gelchinski et al. |
| | (Continued) | |

FOREIGN PATENT DOCUMENTS

| | | |
|---|---|---|
| CN | 104164683 A | 11/2014 |
| CN | 204097583 U | 1/2015 |
| | (Continued) | |

OTHER PUBLICATIONS

Whitaker et al. "Electrochemical printing: software reconfigurable electrochemical microfabrication", J. of Micromechanics and Microengineering, 15, 2005, 1498-1503. (Year: 2005).*

(Continued)

*Primary Examiner* — Stefanie S Wittenberg
(74) *Attorney, Agent, or Firm* — Armstrong Teasdale LLP (57) ABSTRACT

A method for manufacturing a three-dimensional structure by localized electroforming of a material from an electrolytic solution includes emitting a jet of the electrolytic solution towards a target substrate, controlling position of the jet with respect to the target substrate, and controlling potential difference between a control electrode and the target substrate or an ion current intensity through the jet between the control electrode and the target substrate to obtain deposition of material on the target substrate or removal of material from the target substrate. The method further includes injecting a predetermined probing electrical current into an electroforming circuit including the control electrode, the jet, and the target substrate, detecting potential difference across the electroforming circuit, determining present elevation of the three-dimensional structure, comparing the present elevation with a predetermined design elevation and calculating a corresponding elevation difference, and modulating physical parameters of localized electroforming affecting deposition or removal rate.

8 Claims, 3 Drawing Sheets

(56) References Cited

U.S. PATENT DOCUMENTS

| | | | |
|---|---|---|---|
| 5,641,391 A * | 6/1997 | Hunter | C25D 5/02 |
| | | | 205/672 |
| 5,976,339 A | 11/1999 | André, Sr. | |
| 6,027,630 A | 2/2000 | Cohen | |
| 7,368,042 B2 | 5/2008 | Hsu et al. | |
| 7,955,486 B2 * | 6/2011 | Yu | C25D 17/00 |
| | | | 205/133 |
| 2002/0079230 A1 | 6/2002 | Basol et al. | |
| 2005/0202660 A1 | 9/2005 | Cohen et al. | |
| 2007/0089993 A1 * | 4/2007 | Schwartz | B33Y 30/00 |
| | | | 204/224 R |
| 2009/0000364 A1 * | 1/2009 | Yu | C25D 1/02 |
| | | | 204/229.8 |
| 2010/0300886 A1 * | 12/2010 | Lin | C25D 17/10 |
| | | | 204/198 |
| 2011/0031112 A1 | 2/2011 | Birang et al. | |
| 2015/0267311 A1 * | 9/2015 | Braun | C25D 5/026 |
| | | | 204/224 R |
| 2017/0145584 A1 * | 5/2017 | Wirth | C25D 3/40 |
| 2018/0178461 A1 | 6/2018 | Kim et al. | |
| 2019/0055661 A1 * | 2/2019 | Huang | B33Y 30/00 |
| 2019/0203370 A1 * | 7/2019 | Walczyk | C25D 1/003 |

FOREIGN PATENT DOCUMENTS

| | | |
|---|---|---|
| CN | 104593830 A | 5/2015 |
| CN | 108914177 A | 11/2018 |
| EP | 2495357 A2 | 9/2012 |
| WO | 2005033377 A2 | 4/2005 |
| WO | 2005033798 A2 | 4/2005 |
| WO | 2014094810 A1 | 6/2014 |
| WO | 2014201169 A1 | 12/2014 |

OTHER PUBLICATIONS

Yeo et al. "Localized Electrochemical Deposition—The Growth Behavior of Nickel Micro-Columns", 2000, Proceedings of SPIE vol. 4174. (Year: 2000).*

Habib et al. "Development of localized electrochemical deposition control system for fabricating micro EDM electrode", International Journal of Machining and Machinability of Materials, 2017, vol. 19, No. 3. (Year: 2017).*

English translation WO2018028000 (Year: 2018).*

English translation CN 107937939 (Year: 2018).*

Garmendia et al. "In-process height control during laser metal deposition based on structured light 3D scanning", Procedia CIRP 68, 2018, 375-380 (Year: 2018).*

International Search Report for International Patent Application No. PCT/IB2020/057129, mailed Oct. 20, 2020.

J. D. Madden, I. W. Hunter, Three-Dimensional Microfabrication by Localized Electrochemical Deposition, Journal of Microelectromechanical Systems, Mar. 1996, pp. 24-32, vol. 5, No. 1, IEEE, US.

Jie Hu et al., Meniscus—Confined Three-Dimensional Electrodeposition for Direct Writing of Wire Bonds, Science, Jul. 16, 2010, pp. 313-316, vol. 329, AAAS, US.

Yan Li et al., Electrochemical AFM "Dip-Pen" Nanolithography, Journal of the American Chemical Society, Feb. 6, 2001, pp. 2105-2106, vol. 123, Issue 9, ACS, US.

A. P. Suryavanshi et al., Electrochemical fountain pen nanofabrication of vertically grown platinum nanowires, Nanotechnology, Feb. 6, 2007, p. 105305, vol. 18, No. 10, IOP Publishing Ltd., GB.

A. P. Suryavanshi et al., Probe-based electrochemical fabrication of freestanding Cu nanowire array, Applied Physics Letters, Feb. 21, 2006, p. 083103, vol. 88, American Institute of Physics, US.

G. H. Keulegan, Hydrodynamics of Cathode Films, Journal of Research of the National Bureau of Standards, Sep. 1951, pp. 156-169, vol. 47, No. 3, Washington, US.

K. Chen et al., A Low Cost Desktop Electrochemical Metal 3D Printer, Advanced Materials Technologies, Aug. 28, 2017, p. 1700148, vol. 2, Issue 10, Wiley-VCH Verlag GmbH & Co., Weinheim, DE.

M. Kunieda et al., Rapid Prototyping by Selective Electrodeposition Using Electrolyte Jet, CIRP Annals—Manufacturing Technology, 1998, pp. 161-164, vol. 47, Issue 1, CIRP.

* cited by examiner

REAL TIME, CLOSED LOOP FEEDBACK JET-BASED LOCALIZED ELECTROFORMING METHOD AND SYSTEM

CROSS-REFERENCE TO RELATED APPLICATIONS

This application is a National Phase filing of PCT International Application No. PCT/IB2020/057129, having an International Filing Date of Jul. 29, 2020, claiming priority to Italian Patent Application No. 102019000013626, having a filing date of Aug. 1, 2019 each of which is hereby incorporated by reference in its entirety.

FIELD OF THE INVENTION

The present invention generally relates to additive manufacturing and, in particular, to localized electroforming for creating three-dimensional structures.

Specifically, the present invention relates to a method and a system for manufacturing a three-dimensional structure by localized electroforming of at least one material from an electrolytic solution of said material, by means of a jet of said electrolytic solution onto an electrically conductive deposition substrate, according to the preamble of the independent claims.

BACKGROUND OF THE INVENTION

Electroforming includes both aspects of electrodeposition and electroetching of a metal or any conductive material that can be reduced/oxidized from a liquid to a solid form on, respectively from, a surface.

The possibility to realize three-dimensional structures, and particularly metallic three-dimensional structures, with controlled shape by direct 3D printing has multiple potential applications ranging from the medical domain (e.g. manufacturing of custom designed structural replacement parts) to the electronics (e.g. manufacturing of heat exchangers with geometries and performances unachievable with conventional technologies) to aerospace (e.g. manufacturing of injector systems for turbine motors) and to almost any other industrial field.

Currently, the most reliable approach in additive manufacturing is based on the Powder Bed Laser Beam Melting/Syntering (LBM) technique, that is already revolutionizing the established industrial sector.

However, a lower cost process capable of printing some specific metals (e.g. copper) that are notoriously difficult to print by Laser Beam Melting, possibly at room temperature and with resolutions that are difficult to achieve with LBM, is still absent from the current technological landscape.

The electroforming based techniques for the manufacturing of 3D metal structures have evolved significantly over the last 50 years. They are able to localize an electrodeposition or electroetching process on a limited area of a substrate (a working spot) and then, by moving this working spot, to create three-dimensional structures from an electrodeposition bath.

Multiple approaches have been proposed in literature. In 1996 J. D. Madden and I. W. Hunter, in "Three-dimensional microfabrication by localized electrochemical deposition" propose the use of a sharp anode close to the intended deposition area on the cathode to localize the deposition. The process is, however, limited to very small scales due to the formation of a diffusion-limited layer in proximity of the cathode. Moreover, no real-time process control is addressed.

A number of variations on the electrochemical technique have yielded similar results. Meniscus confined electrodeposition has been successfully applied to the development of sub-micron electronics interconnections (J. Hu and M.-F. Yu, "Meniscus-confined three-dimensional electrodeposition for direct writing of wire bonds", *Science*, vol. 329, pp. 313-316, 2010) while dip-pen electrodeposition (Y. Li, B. W. Maynor, and J. Liu, "Electrochemical AFM "dip-pen" nanolithography", *Journal of the American Chemical Society*, vol. 123, pp. 2105-2106, 2001), fountain pen process (A. P. Suryavanshi and M.-F. Yu, "Electrochemical fountain pen nanofabrication of vertically grown platinum nanowires", *Nanotechnology*, vol. 18, p. 105305, 2007) and probe based approaches (A. P. Suryavanshi and M.-F. Yu, "Probe-based electrochemical fabrication of freestanding Cu nanowire array", *Applied physics letters, vol.* 88, p. 083103, 2006) suffer from similar limitations and have been demonstrated mainly on the micron scale.

The main limitations encountered by electrochemical printing have been in the deposition rate and the size of printed features. The limitation on the deposition rate is related to the diffusion-limited layer forming in the proximity of the cathode, which is described in G. H. Keulegan, "Hydrodynamics of cathode films", National Bureau of Standards, 1951. As diffusion driven transport become increasingly ineffective at larger dimensional scales, the poor scaling properties of the stationary probe approach for metal 3D printing follow. Meniscus-confined approaches pose the additional challenge that a stable meniscus typically is hard to maintain on large scales. Some recent attempts to circumvent these limits have met with success by X. Chen, X. Liu, P. Childs, N. Brandon, and B. Wu, "A Low Cost Desktop Electrochemical Metal 3D Printer", Advanced Materials Technologies, 2017. Here, the authors achieved electrochemical metal printing on the millimetre scale by using a syringe with a sponge inserted as the print head. The reverse pressure from the sponge allowed a meniscus of diameter 400 um to be formed, extending its natural size limit.

M. H. Gelchinski, L. T. Romankiw, D. R. Vigliotti, and R. J. V. Gutfeld, "Laser-enhanced jet-plating and jet-etching: high-speed maskless patterning method", ed. Google Patents, 1985 realized high deposition rates (10 um/s) for microstructures (50 um width) using a sharp anode and flat cathode immersed in a jetted electrolyte used as optical waveguide for an high power laser beam. This combination avoids the diffusion region limits but still operates at limited dimensional scales.

An approach to remove the limiting effect of the diffusion layer is to employ a fast electrolyte jet to disrupt it.

Generally speaking, it is known to adopt electrodeposition of metals or like conductive materials at a high speed and in a spatially localized manner by means of a thin jet of an electrolytic solution ejected at high speed by a spatially controlled nozzle. An electrochemical deposition system of a material on a substrate acts by means of at least one nozzle emitting an electrolytic solution jet of the material towards the substrate and at least one associated electrode for controlling a flow of the electrolytic solution with respect to the substrate. The spatial location of the deposition and the local deposition rate of the material are controlled over time to form three-dimensional structures according to a predetermined pattern of configuration. The modulation of the applied voltage between one or more electrodes—associated with respective emission nozzles—and the substrate allows to carry out a deposition of the electrolytic solution of the material on the substrate and to control the rate of deposition, as well as the morphology of the deposited material. Furthermore, an inversion of the polarity of the voltage between the emission electrode(s) associated with the nozzle (s) and the deposition substrate, and a modulation of the voltage with inverted polarity, allow to realize and control a removal (etching) of the previously deposited material from the substrate, which can be finalized to the on-site polishing of the deposited layers.

The modulation of the voltage applied between the electrodes therefore causes deposition or removal of material on the substrate which is controlled over time and space. Advantageously, it is possible to continuously switch from the localized deposition to the localized removal, simply by controlling the voltage (or the current) between the electrodes and the substrate.

Already in 1992, U.S. Pat. No. 3,810,829 describes a process for localized metal plating and material removal based on the use of a mobile nozzle emitting a liquid electrolyte jet while moving on a predefined path and achieving metal deposition or removal by modulation of the voltage applied to the flowing electrolyte. This approach is intended solely for plating, the nozzle moves solely on a 2 dimensional plane and there is no mention of any mechanism to dynamically control the deposition/removal process based on the actual features of the material that has been already deposited.

U.S. Pat. No. 5,976,339, US 2005/0202660 and U.S. Pat. No. 6,027,630 aim to achieve a localized electrodeposition according to a specific pattern by masking the areas where deposition is not desired. No other control mechanism is proposed to dynamically control the deposition parameters based on the process evolution and the bath-based approach suffers from inherent current density limitations in the deposition rate due to the formation of a diffusion layer in the proximity of the cathode.

CN 104164683 and CN 204097583 attempt to locally modulate the material deposition profile by using an array of mutually isolated metallic anodic orifices, individually connected to separate electrical generators, each providing a flow of electrolyte in the proximity of different cathodic target regions and separately controlling the electrical potential of each flow. While this approach allows for a "parallel" deposition process, it does not address the diffusion layer related rate limitation and does not incorporate any mechanism to modulate each flow potential based on the actual characteristics of the local deposition progression.

US 2007/089993 proposes a system for MEMS fabrication by the use of an array of electrolyte jet nozzles where each nozzle potential is independently determined while the global position of the nozzle array with respect to the cathodic substrate is dynamically controlled to form the intended shape. This approach lacks, however, a feedback system allowing to dynamically modulate the deposition parameters based on the actual deposited profile to ultimately achieve the desired shape.

WO 2005/033798 discloses the use of a multi-channel anode where each channel is an individually addressable electrode and the electrolyte flows through each of them. Controlling each channel voltage allows to deposit a desired pattern of metal on the cathode and, by repeating the process, ultimately a 3D structure can be achieved. However, once more, there is no mechanism providing a clear feedback about the structure being built in real time.

The importance of a real-time feedback mechanism during the electrodeposition is related to the inherent dynamical instability of the metal deposition process.

The reduction of ions to the metal form and their adhesion to the substrate is, intrinsically, a statistical process where many difficult-to-control factors (e.g. initial surface roughness, current fluctuations, statistical ionic concentration fluctuations, current localization effects, . . . ) lead to a roughness in the deposited layer. The process instability occurs from the fact that any asperity with small protruding features on an electrodeposited film tends to act as an ionic current concentrator for the further deposition, that is thus locally enhanced, while any lack of deposition forming small recesses on the film will lead to a subsequent reduction in the local current density and subsequent deposition rate. Due to the specific characteristics of the electrochemical controlling equations (e.g. non linearity of the Butler Voltmer equation between voltage and current) this effect increases exponentially with the thickness of the deposited feature leading to uncontrollable discrepancies between the desired profile and the obtained profile.

This effect is exhaustively discussed by M. Kunieda, R. Katoh, and Y. Mori in "Rapid prototyping by selective electrodeposition using electrolyte jet", *CIRP Annals-Manufacturing Technology*, vol. 47, pp. 161-164, 1998.

Figure 1:
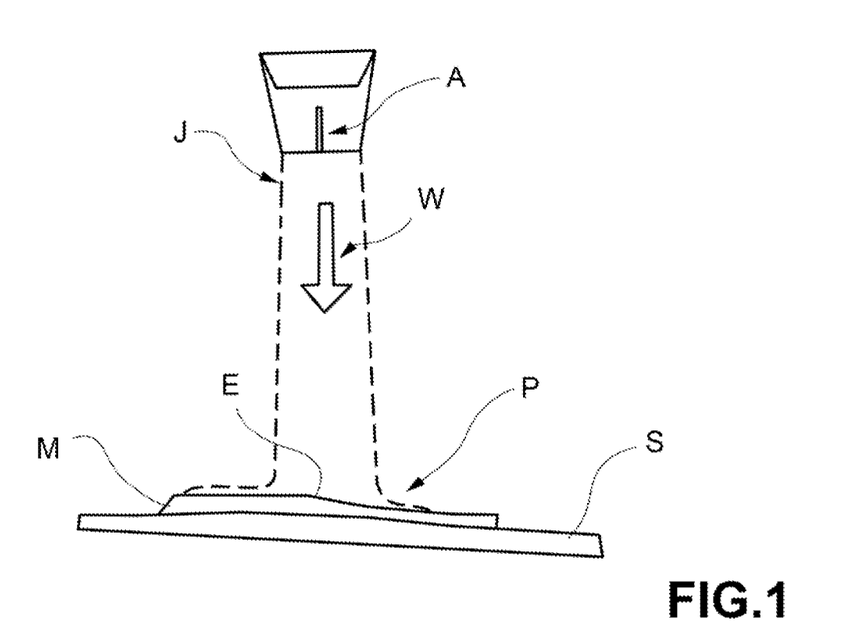
FIGS. 1 and 2—already discussed—summarily depict an exemplary process of localized electrochemical deposition by means of jets of an electrolytic solution of a metal, causing a deposition anomaly to occur in an otherwise predetermined flat profile.
Figure 2:
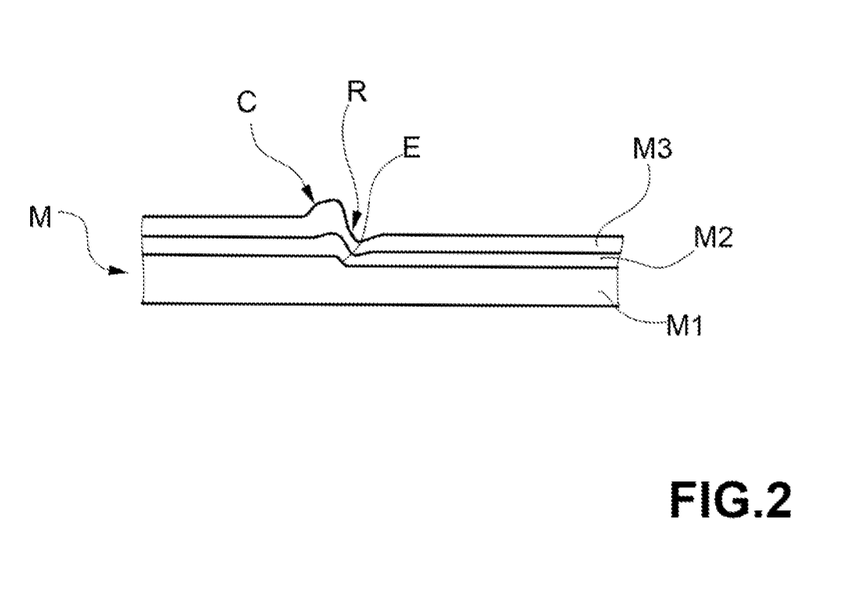

FIGS. 1 and 2 summarily depict an exemplary process of localized electrochemical deposition of a metal (or any other suitable material) according to a predetermined vertical "blade" structure, i.e. a rectilinear region of significant height (e.g. 5 mm), by means of jets of an electrolytic solution of the metal. In the figures, S is the deposition or base substrate (acting as a cathode plate), A is the anode, which is associated with a nozzle N emitting a jet J of electrolyte material which flows in the direction indicated by the arrow W, and M is the metallic material previously deposited in the process, which acts as the target substrate of a subsequent deposition step.

The metal is deposited with a constant current through the electrolyte jet while the nozzle N moves along the rectilinear predetermined path of finite length. Usually, the standoff distance between the nozzle and the cathode plate is controlled so as to avoid any impact against the material being deposited under the nozzle. Specifically, by operating at a constant current, when a measured voltage decreases the deposited material is approaching the nozzle and when the measured voltage goes below a predetermined critical voltage threshold, the nozzle is retracted so as to avoid depositing the material inside the nozzle volume. The distance between the nozzle and the material under deposition is also desirably kept at a minimum in order to reduce the resistance of the free path of the jet and to reliably control the electroforming process by minimizing the effects of jet breaking due to the interaction between the inner viscous forces and the friction with the ambient air.

At each deposition step along the path, approximately 1 micron thickness of the metal can be deposited so that the fabrication of the vertical "blade" structure requires around 50,000 passages. What happens, however, is that, at each deposition step the thickness of the actually deposited metal M initially varies randomly along the path. In a single passage, for example, the amount of material that may be deposited varies with the position along the path from 1.001 to 0.999 microns (a fluctuation of 0.1%). This phenomenon is inherently linked to the statistical nature of the electrodeposition process in which the number of ions that is reduced at each point of the impact region varies slightly due to tiny fluctuations in the ionic density of the liquid or to turbulent phenomena within the jet itself.

If the process remained of a random nature, it would not create insurmountable problems in the 3D structuring. The problem is that the metal deposition rate varies exponentially with the difference in electrical potential between the electrolyte jet J (connected to an anode positive electrical power supply) and the target substrate M (connected to a cathode negative electrical power supply). A control system of the deposition process imposes a potential difference between the anode A (i.e. the positive electrode, which is located inside the bath where the deposition substrate is immersed, upstream of the electrolyte jet J) and the cathode (i.e. the target substrate M, where the deposition takes place). The potential difference can be controlled in a very precise (and dynamic) way between these two electrodes.

The target substrate M where the deposition takes place, being made of metal, can be considered to have a uniform potential and this also includes the amount of metal previously deposited on the base substrate S in the process, which is in direct electrical contact with the base substrate S.

On the other hand, the electrolyte jet J has an electric resistivity that varies proportionally to the length of the jet between the point of emission at the nozzle N and the point of impact with the target substrate M. When an ion current flows through the jet J, the point of impact of the jet on the target substrate M will therefore be at a lower potential than that of the anode A, by an amount equal to the current flowing in the electrolytic circuit (the jet) multiplied by the resistance of the jet and the further resistance of the liquid in the electrolytic cell and at the interface between anode and bath (as per the Ohm's Law). While the last two factors are constant, the first one (the jet's resistance) changes proportionally to the length of the jet itself at each point of the impact area, generally indicated P in these figures.

In FIG. 1 it is depicted the case where the jet J hits an impact area P of the target substrate M where, due to previous deposition, there is a difference in height in the metal profile of the formed structure within the diameter of the impact region P, i.e. the jet J hits the edge of a "step" E. In this case, the distance traveled by the electrolyte solution in the jet J to reach the top of the step, i.e. the distance traveled in a column region of the jet above the step E (left in the figure), will be slightly less than the distance traveled by the electrolyte solution in another column region of the jet above the planar region of the target substrate M in front of the step (right in the figure). Due to the finite resistance of the electrolyte solution, the part of the jet that impacts the raised part of the step, will have a slightly greater potential, at the impact point, than the part of the jet that impacts the planar region in front of the step as the voltage drop along the jet traveling from the nozzle to the impact point is smaller in the former case than in the latter.

According to the electrochemical equations that regulate electrodeposition, there is an exponential relationship between the ionic current (the quantity of ions which are reduced to metal and which, in the final analysis are deposited on the target substrate) and the local voltage difference between the jet and the target substrate. As a consequence thereof, a very small voltage difference between two distinct areas of the jet J causes a preferential deposition of metal on the upper part of the step E, which is visible in the figure. This process tends to be amplified at each step since the preferential deposition creates a locally higher structure which, in the next step, determines the same phenomenon (with an intensity so much greater as the height difference increases). Moreover, since the ion current is constant in the jet J, the edge of the step will have a deposition rate higher than the average expected based on the current amount as the electric charge not deposited in the lower part of the step is compensated by the one that is deposited in the upper part) resulting not only in the amplification of the step but, indeed, in the formation of a column structure C on the edge, as shown in the enlarged view of FIG. 2, where three different layers of deposition M1, M2 and M3 are exemplary depicted. Also, the formation of a column structure is associated with the formation of a recess R immediately downstream of the column relief.

This is an intrinsically unstable deposition process in the absence of some control mechanism that contrasts the above-disclosed phenomenon.

For this reason, the resulting deposition will become progressively rougher and exhibit localized and, eventually, dendritic grow preventing ultimately the deposition of large thicknesses (>1 mm) of material.

Thus, while jet based deposition localization can achieve very high metal growth rate due to the disruption, by the fast liquid jet, of the diffusion layer at the solid/liquid interface, growth of thick deposits is inhibited by the localized growth of undesired structures due to the intrinsic instability of the electrodeposition process.

The importance of this subject is manifest by a multiplicity of patents related to dynamical control of the deposition characteristics in electronics wafer metallization processes. Albeit they all refer to a bath deposition process, the nature of the instability is the same and it is similarly difficult to control.

In WO 2014/201169 a multiplicity of individually controllable anodes and a corresponding set of sensors (eddy current) are employed to deposit and monitor in multiple locations the deposition process of copper on a wafer in a bath configuration where the sensors signal is used to dynamically control each anode operating point to achieve the desired deposition profile.

In EP 2 495 357 a single vibrating sensor is placed in the deposition bath in the vicinity of the target wafer so that copper will deposit on it too. From the variation of the oscillation modes, a local measurement of the deposition process is achieved.

In WO 2014/94810 cathodic current is measured at the top and bottom of a wafer with at least a via to be filled and a calculation method, based on these parameters, is proposed to assess if the via can be completely filled.

US 2011/0031112 resorts again to an array of sensors immersed in the bath to monitor in multiple locations the deposition process as does U.S. Pat. No. 7,368,042 where the difference is that in the latter all the cathode and sensor assembly is rotating to optimize the process uniformity.

In WO 2005/33377 the control of the profile is based on a multi-anode assembly where the individual anodes are controlled to maintain the time profile of the individual deposition currents based on previous results on a test wafer where satisfactory profile was achieved.

In this case no real time sensing is employed.

US 2002/0079230 resorts to a conductive multi-element mesh placed between the anode and the target wafer where each mesh element can be individually controlled to "divert" the deposition away from the underlying wafer area and onto itself. The mesh can also be in relative motion with respect to the anode. By proper ON-OFF time control of the mesh elements, the effective local deposition rate on the wafer can be controlled. Combining this with the potential abrasive and polishing effect of the mesh itself, the ability to achieve improved flatness on the electrodeposited profile is claimed.

However, as in the previous case, no real time feedback mechanism from the profile to the mesh control is provided.

In conclusion, while the achievement of a desired deposition profile, and in particular of a uniform one on a wafer, is of the utmost importance, in the current art either no control of the process is used or, when it is, it relies on a discrete set of additional sensors adding significant complexity to the system to provide, at most, a monitoring of the process in a limited number of locations.

SUMMARY OF THE INVENTION

The aim of the present invention is to provide a solution that avoids the drawbacks of the prior art. Particularly, an aim of the present invention is to provide an approach to localized electroforming that allows to achieve a desired 3D structure profile overcoming the effects of dynamical instability of the electroforming process. A further aim of the present invention is to provide a control technique for manufacturing a three-dimensional structure by localized electroforming of a material without increasing the complexity and costs of the related method and system.

According to the invention, this aim is achieved by a method and a system for manufacturing a three-dimensional structure by localized electroforming of at least one material from an electrolytic solution of said material, by means of a jet of said solution onto an electrically conductive deposition substrate, having the features claimed in the respective independent claims.

Preferred embodiments are defined in the dependent claims, whose content is also to be considered an integral part of the present description. Features of the dependent claims may be combined with the features of the independent claims as appropriate, and in combinations other than those explicitly set out in the claims.

According to the present invention, a desired, predetermined, three-dimensional structure profile, such as metallic structure profile, is achieved by means of a liquid jet-based localized electroforming (i.e. electrodeposition and/or electroetching) system on a cathode substrate.

In summary, the present invention is based on the principle of getting a real-time sensing and feedback on the 3D surface under formation (be it by deposition or by etching) and compare it with a predetermined desired 3D shape at each formation (deposition or etching) cycle or step so as to allow to dynamically modulate the deposition/etching parameters based on the actual current structure profile, to ultimately achieve the desired shape.

This is achieved, in a preferred embodiment, by exploiting an embedded sensitive mechanism to continuously measure in real time the actual deposited profile (target substrate) and allowing for continuous tuning of the deposition or etching parameters as a function of the deposition or etching location and the measured actual deposited profile (i.e. the morphology of the structure under formation). Any desired profile may be achieved by scanning the target current cathode surface (the target substrate) and dynamically modifying the deposition or etching rate based on the desired profile and on the current structure morphology.

Specifically, knowledge of the three-dimensional structure morphology at any deposition or etching step allows to counteract the deviations between the achieved morphology and the target morphology by consequentially modulating the voltage applied between the electrode(s) associated with the emission nozzle(s) and the target substrate (or the current flowing along the jet) at a subsequent deposition or etching step as a function of the instantaneous nozzle position.

This forms a closed loop localized electrochemical metal deposition (or removal) system.

The preferred solution for continuous in-situ and in-process monitoring of the morphology of the deposition is a direct morphology monitoring based on the resistance change of the electroforming circuit (the anode, the jet, the cathode) due to the change in length of the jet portion between the nozzle and the jet impact point over the target substrate, instead of the prior art techniques based on optical in situ interferometry or mechanical profilometers coupled with the deposition system, which face challenges due to the complex environment where the process occurs (e.g. presence of acids and moving liquids).

Specifically, monitoring the 3D structure morphology anomalies (as a result of comparison between the actual local height of the structure under formation and the predetermined, desired one) at each nozzle position during the electroforming process implements a feedback mechanism which allows to dynamically control one or more electroforming (deposition or etching) parameters as a function of the position of the jet on the electroforming path, i.e as a function of the position of the nozzle with respect to the target substrate, to counteract the formation of spurious reliefs or recesses and/or to eliminate reliefs and recesses that have already been formed.

Specifically, the real-time controllable electroforming physical parameters are at least one of the following:

a) Ion current through the jet;
b) Speed of movement of the jet (i.e. the nozzle) along the electroforming path; and
c) Dynamic characteristics of the jet (e.g. jet speed in the direction to the target substrate).

In order to monitor the deposition profile in real time (i.e. preferably during a deposition or etching cycle or round) and to establish how this is deviating from the predetermined, desired one, point by point, i.e. at a predetermined granularity, the following is advantageously adopted.

Operating with a constant electrical current through the jet (or with a variable current provided that other electrical parameters are known, such as the current-voltage relationship at the interface between the anode electrode and the electrolyte as well as between the electrolyte and the cathode electrode), a direct method to monitor the deposition profile along the electroformation path is based on the knowledge of the electrical resistance characteristic of the electrolyte jet.

As discussed above, the electrical circuit that includes the jet shows a resistive characteristic which is proportional to the distance traveled by the jet between its point of emission from the nozzle (at the anode) and its point of impact on the target substrate (at the cathode), which is called the length of the "free" jet. Although the electric circuits containing electrochemical elements (interfaces between electrolytes and metals on which processes of oxidation and reduction take place) are non-ohmmic (i.e. with the variation of the current the oxidation and reduction voltage on these interfaces varies in a non-linear way), operating at constant current and without varying the areas of these interfaces, all the non-ohmic components of the resistive characteristic remain unchanged and a linear dependence is established between the overall resistance of the circuit and the length of the free jet.

Since, as discussed above, the length of the free jet varies with the variation of the deposited surface and varies with respect to the expected one when it impacts on one morphology anomaly of the target substrate, due to the total current through the jet being kept constant, this is mainly manifested in a variation of the potential difference between the anode and the cathode. Although, this approach may seem counter-intuitive because applications are known where the voltage is controlled and possibly kept constant and variations in the current are measured, in electrochemistry systems are also common that operate automatically to maintain the current constant (and therefore automatically changing the anode voltage) by means of specific instruments (galvanostats).

Therefore, assuming a constant current in the circuit, the variation in the potential difference between anode and cathode is measured and proportional to the resistance of the electrochemical circuit and, ultimately, to the length of the free jet J which, in turn, depends directly on the overall profile of the material M previously deposited in the impact area P of the jet. Advantageously, the fact that the relationship between current and voltage is exponential makes the presence of "positive" anomalies (or peaks of deposition) very visible in terms of local voltage variation.

This allows to sense the morphology of the deposited material in a way conceptually similar to that of a Tunneling Electron Microscope, that may be called a Resistive Ionic Microscope.

Since the voltage drop at the interface between the anode electrode and the electrolyte as well as between the electrolyte and the cathode electrode is not known, calibration of this "microscope" is obtained by aiming the jet in a free region of the target substrate, controlling a constant current through the electrolytic jet and, on a predetermined calibration time scale such as a time scale of a few seconds, monitoring the variation of the anodic voltage (i.e. the potential difference between anode and cathodes) while a vertical movement (i.e. along the Z direction orthogonal to the target substrate) of the nozzle is performed for a controlled predetermined distance, thus effecting a variation of the length of the jet of electrolyte solution. Assuming that the material that is deposited in this phase has a negligible thickness compared to the variation of free jet length caused by the movement in Z of the nozzle, it is possible to obtain a nominal relationship between the anode voltage variation and the free jet length at the specific current value and jet diameter.

This calibration can then be used to derive local changes in the height of a deposited material based on measured voltage variations acquired along a nozzle path during a scanning step of the target substrate. Such a scanning step may be performed as an autonomous step between two active deposition/etching steps or may be integrated in an active deposition/etching step. It may be appreciated that such a scanning step, which is here described in conjunction with an electroforming process, may clearly be performed independently of the electroforming process, as a stand-alone technique for mapping the height profile of any 3D metal structure, i.e. as a profile measurement system for conductive microstructures.

Advantageously, during a constant current deposition phase, the anodic voltage monitoring provides a real-time mapping of the overall profile and thickness of the deposited material.

Alternatively, it is possible to operate with a variable electrical current through the jet (and at a constant voltage) provided that the relationship between the current and the voltage at the interface between the electrolyte and the anode and cathode electrodes be known. This is a non-ohmic relationship according to the Butler Voltmer equation and it may be determined in a further calibration step where the distance between the nozzle and the target substrate is kept constant and the electroforming circuit (the anode, the jet, the cathode) is fed with varying current values so as to detect the voltage across the electroforming circuit. A subsequent scan at a fixed current value and varying distance between the nozzle and the target substrate allows the ohmic resistance of the electrolyte jet to be calculated. By combining the two information, it is possible to derive the current vs voltage curve at the interfaces between the electrolyte and the electrodes as well as the ohmic part of the overall resistance.

The above-disclosed technique for real-time detecting the deposition profile, i.e. for mapping the morphology of a target substrate, during an electroforming process allows for an efficient closed loop control of the overall deposition process. Indeed, once a deposition profile is obtained as a result of the last deposition step, it is possible to actuate a compensation method.

To this aim, the information on the current deposition profile can be used in subsequent deposition steps to modify the ion current according to the position of the nozzle along its path.

Specifically, a ion current profile aimed at smoothing out excess deposition reliefs and bridging the gaps of insufficient deposition may be controlled based on the detected deposition profile and a predetermined or controlled law of movement over the time of the nozzle along the path representative of the point of impact of the jet on the target substrate. In some cases, the deposition process can even be locally reversed by applying a negative anodic voltage to remove excess material locally so that the same mechanism that led to an anomalous accumulation of material in a region contributes to the preferential removal of excess material from the same region.

BRIEF DESCRIPTION OF THE DRAWINGS

Further functional and structural characteristics and advantages of the present invention are set out in the detailed description below, provided purely as a non-limiting example, with reference to the attached drawings, in which.

DETAILED DESCRIPTION

Figure 3:
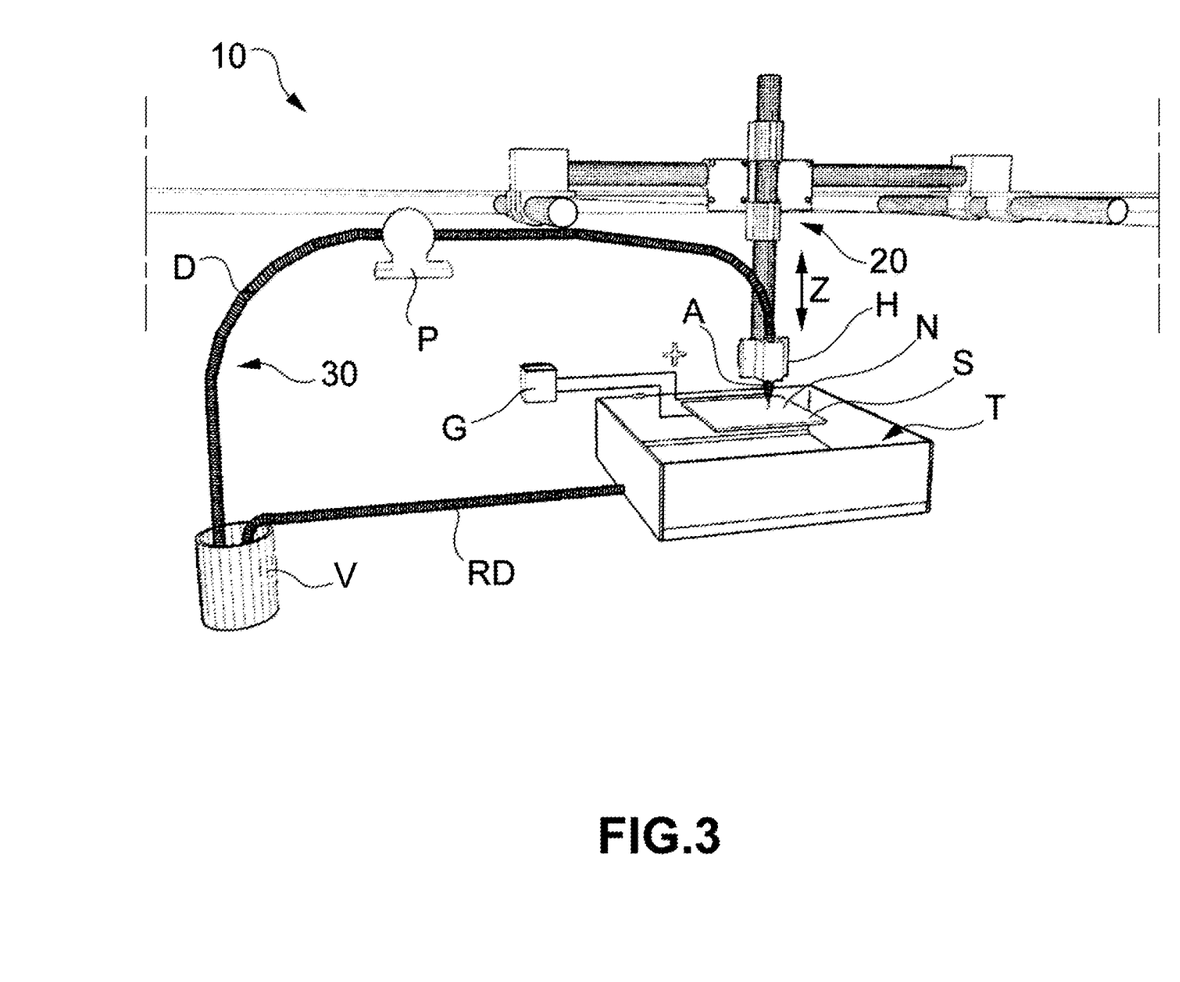
FIG. 3 is an overall diagram of a system for the manufacture of three-dimensional microstructures according to the invention.

With reference to FIG. 3, a system 10 for manufacturing three-dimensional microstructures is shown, comprising a system 20 for moving a 3 or 5-axis working head H, in which the provision of a 5-axis movement allows to create complex structures. The system 20 for moving the working head H may be of the X,Y-Cartesian type, in which the movement of the head takes place on 3 perpendicular axes, of the Delta type, in which the movement of the head takes place by means of 3 suspended arms, or of one of the two types mentioned above with the inclusion of the possibility of rotating the working head around two perpendicular axes (obtaining a 5-axis system). The system 20 is adapted to control the relative position of the working head with respect to a substrate in such a way as to follow a predefined path of material processing with respect to a reference system of a three-dimensional structure being formed. The system 20 comprises means for controlling the relative bi-dimensional position of the working head over the substrate over time, said means being arranged to move the working head so as to control a speed of scanning of the substrate by the head according to said relative bi-dimensional position and a predetermined configuration pattern of the three-dimensional structure to be fabricated.

The working head (also known as deposition head or print head) H comprises at least one control electrode, such as a metal anode A, associated with a system 30 for distributing at least one electrolytic solution containing dissolved metal ions, and at least one nozzle N associated with the anode A or which can possibly integrate the anode A, arranged for the outflow of jets of said electrolytic solution. The anode can be of the same material that is deposited, and in this case it is a "sacrificial anode" which supplies the ions for the deposition and consumes itself. The nozzle can comprise, for example, a rigid tubular segment terminated by means of a diaphragm provided with an orifice of predetermined diameter and shape suitable for the selected type, processing parameters and material. The nozzle can integrate the anode function where it is made of conductive material.

The system 10 further comprises at least one conductive deposition substrate S, preferably a planar support, with respect to which the working head H is moved, adapted to receive the deposition of a material for the formation of one or more structures. The planar support is larger than the working head and lies on a plane parallel to the XY axes where the head is moved or to the head movement plane, located a short distance from it.

The system 30 for distributing an electrolytic solution includes at least one storage tank V for an electrolytic solution of a deposition material, at least one duct D for transferring the electrolytic solution to the working head, preferably flexible (for example in silicone), a pumping system P interposed along the duct D and at least one collection tank T of the electrolytic solution, which is in turn in a fluid connection with the tank V through a return duct RD. The system 30 ensures a controlled flow of electrolytic solution from the nozzle N towards the support S. The pumping system P allows to regulate the flow of electrolytic solution along the duct generating at least one liquid jet at high speed from the nozzle. Without loss of generality, one can assume that the pump P is fed directly from the tank T or any other possible configuration, that will be apparent to the experts of the field, where the electrolyte is recycled through a fluid circuit.

The deposition conductive substrate S, or planar support, is arranged in the collection tank T and its distance from the working head H is adjustable with movement along an axis Z.

The nozzle N faces the planar support S which intercepts the jets of electrolytic solution projected by the nozzle in at least a selectively controlled deposition area through the relative movement between the working head H and the planar support.

At least one programmable electric wave generator G is connected at a first pole, for example a positive pole, to the anode A associated with the nozzle N and at a second pole, for example a negative pole, to the conductive planar support S. A circuit arrangement associated with the electric generator G is arranged to modulate the potential difference applied between the anode A and the planar support S (acting as a cathode), in which a potential difference having a first polarity causes a deposition of material on the support S and a potential difference of reverse polarity causes material removal from the support S, the deposition or removal rate being correlated to the potential difference applied between anode A and support S.

The electric generator and the circuit arrangement associated thereto are arranged to deliver an electric driving current to the anode (or, in a separate manner, to each anode) maintaining the current at a controllable value by automatically compensating the variations of the resistivity of the circuit (constant current source). As an alternative, the circuit arrangement associated with the electric generator G is arranged to modulate the ion current through the jet (variable current source).

A detailed view of the jet J, contacting the anode A and exiting from nozzle N to impact on a previously deposited material (target substrate) on the cathode is shown in FIG. 2, where a deposition with variable thickness is visible.

In the deposition process, the current runs from the anode to the cathode through the electric circuit formed by the anode, the jet portion between the anode and the material deposited on the cathode and forming the target substrate, and the cathode base substrate itself. During each scan of the target substrate, as the electrolyte jet is emitted by nozzle N moving parallel to the cathode base substrate at a predetermined distance therefrom, the resistance of such a circuit comprises both (i) components that do not depend on the nozzle-to-target substrate distance (e.g. the anode-to-electrolyte and the cathode-to-electrolyte interface, the liquid circuit inside the tubing, filters and nozzle) and are therefore approximately constant, and (ii) a component related to the length of the free jet from the nozzle to the impact point over the target substrate, that linearly depends on the nozzle-to-substrate distance, i.e. the distance between the anode and the target substrate corresponding to the surface of the deposited material.

When the electrolyte jet hovers over some features in relief on the target substrate that are connected to the cathode substrate, the distance between the nozzle and the local feature of said structure depends on the feature height. As a consequence, the length of the liquid jet between the nozzle outlet and the impact point (free jet) on the feature changes with the height of the structure itself. This results in a change in resistance of the whole circuit proportional to the change in such a length and, therefore, to the height of the structure. When, as in a preferred embodiment of the present invention, the material deposition occurs at a constant current, or in a scanning step of the target substrate at a constant current, that is separate from the deposition step, the voltage applied to the circuit will change linearly with the free jet length and, therefore, with the height of the feature at the specific position in the XY plane. Such a change can be detected as a function of the XY position of the nozzle over the target substrate in the reference system, thus creating a complete map of the structure topography and morphology during the deposition process itself.

Figure 4:
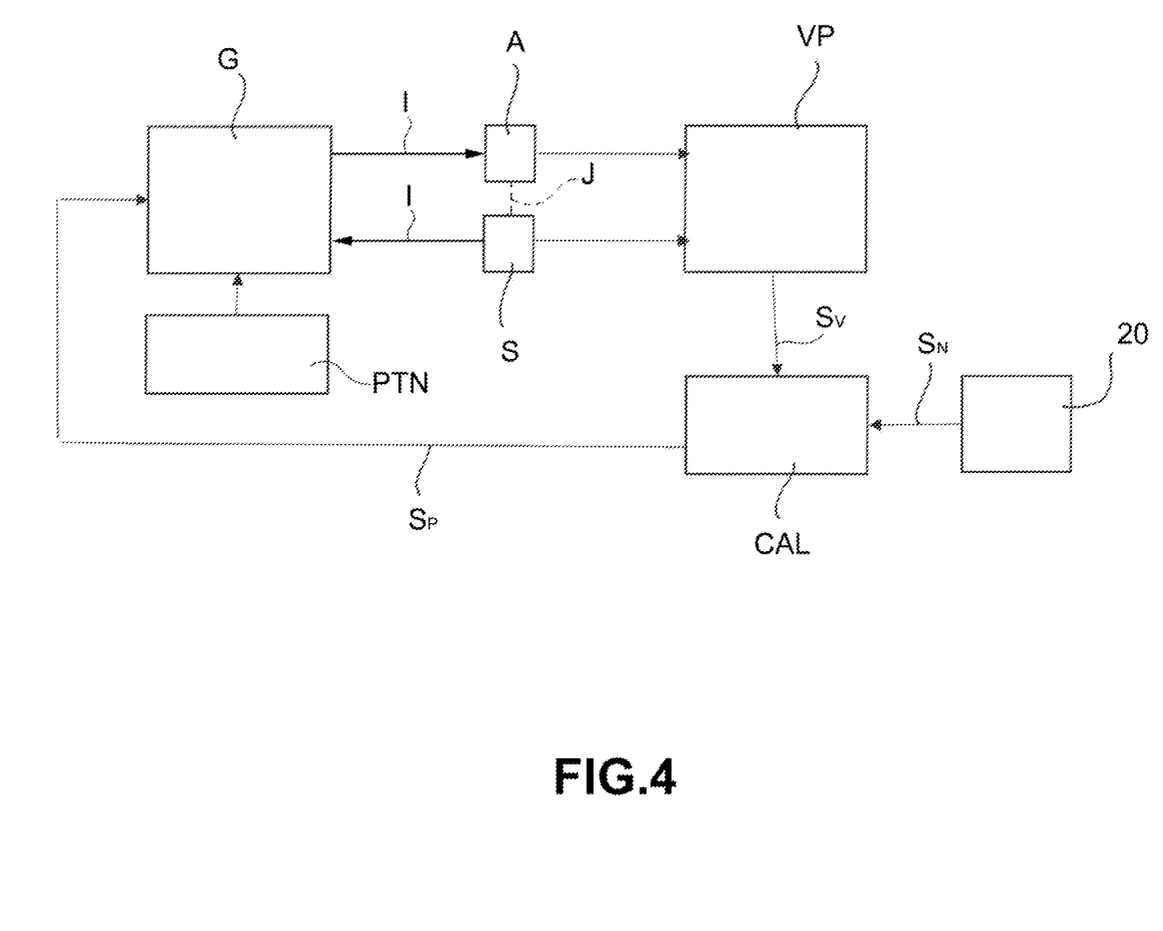
FIG. 4 is a block diagram of a control assembly for the system of FIG. 3.

FIG. 4 diagrammatically shows a control assembly for the system of FIG. 3.

The programmable electric wave generator G is connected to the anode A, associated with the nozzle, and to the conductive planar support or cathode base substrate S to deliver an electric driving current I at the anode A that is intended to flow through the electrolytic jet J to the cathode S. The current is modulated along an electroforming path as a function of the spatial position of the nozzle N with respect to the target substrate over time according to a predetermined configuration pattern $I=I(x(t), y(t), z(t))$ stored in a map PTN, that represents the desired morphology of the three-dimensional structure under formation, and the actual deposited profile.

A voltage probe VP is coupled to the anode A and the cathode S and is configured to detect the potential difference established between the anode A and the cathode S.

Calculation means CAL are coupled to the voltage probe VP and to the system 20 for moving the working head H or—in a functionally equivalent way—to a nozzle position sensor configured to determine the position of the nozzle with respect to the target substrate in the reference system. The calculation means CAL are arranged to receive a signal or data $S_V$ indicative of the instantaneous potential difference established between the anode and the cathode as well as a signal or data $S_N$ indicative of the position of the nozzle. The calculation means are configured to calculate the profile of the deposited material M in the current impact area of the electrolytic jet, i.e. its height along the direction orthogonal to the target substrate, based on the known nozzle position and the knowledge of the length of the free jet J which is derived from the detected potential difference or the detected variation in the potential difference between anode and cathode.

The calculation means CAL is coupled at their output to the programmable electric wave generator G for transmitting a signal or data $S_P$ indicative of the profile of the deposited material M in the current impact area of the electrolytic jet.

The electric wave generator G is programmed to control the current based on the detected deposition profile received through signal or data $S_P$ and a predetermined or controlled law of movement over the time of the nozzle along the path representative of the point of impact of the jet on the target substrate, stored in map PTN.

Control of the deposition rate to change the local amount of deposited material on the target substrate in a corrective action may be carried out in a subsequent deposition/etching step, or in subsequent deposition/etching steps, by one of the following electroforming modulation approaches, as a function of the spatial position of the nozzle and of the measured existing topography:
  a) direct current amplitude modulation, i.e. changing the absolute value of the current;
  b) duty cycle modulation, if a pulsed electroforming current is used, i.e. modulating a constant current by Pulse Width Modulation by creating a current square wave where the Duty Cycle of the wave depends on the physical position of the nozzle (and the jet impact point) along the path;
  c) insertion of a current reversal phase to switch from deposition to removal at the target spot, i.e. inverting the sign of the current thus leading to localized etching, where positive anomalies (reliefs) are present to etch them back;
  d) change of the hydrodynamic characteristics of the electrolytic jet (e.g. speed of emission);
  e) change in scanning speed (i.e. the nozzle speed on movement in the XY plane) to reduce/enhance deposition in specific areas;
  f) change in the elevation of the nozzle over the target substrate to control the resistance of the overall circuit; and
  g) change in the chemical composition of the electrolyte (e.g. by addition of suitable agents to suppress localized growth, or to speed up or slow down the overall process).

Specifically, approaches a) to c) allow to calculate at the calculation means CAL or at the programmable electric wave generator G a space-dependent profile of the driving current that allows to counteract or remove the anomalies in the deposition profile detected by measuring the deposition profile according to the method discussed above during a constant-current scan and deposition, or only scan, passage.

This driving current profile can be dynamically changed based on subsequent deposition profile measurements with larger current modifications (positive or negative) where there are larger differences between the predetermined desired profile and the achieved deposition profile.

The most effective approach is approach c) as the exponential voltage-to-current dependence will concentrate the etching process on the sharpest and tallest positive anomalies while "sparing" the recesses or valleys (negative anomalies) when the jet crosses at the same time both positive and negative anomalies. In other terms, while the electrodeposition process is inherently unstable due to a positive feedback mechanism in the growth of anomalies (the taller is the positive anomaly, the faster it grows), the electro-removal process leads to an inherently flat structure due to the same mechanism acting, however, as negative feedback (the taller is the positive anomaly, the faster it is etched).

Combining approaches b) and c) a three levels periodic signal could be employed, with a total duration small with respect to the movement speed of the nozzle, and having a first signal portion, at a given positive deposition current, with a first predetermined duration, a second signal portion, with a second predetermined duration, where the current is null, a third signal portion where the current assumes a preset negative value (leading to material removal) with a third predetermined duration, followed by a fourth signal portion again at null current for a fourth predetermined duration before repeating the signal. The predetermined duration of each different signal portion can be changed during the movement of the nozzle along the electroforming path.

Combining approaches a) and c) an arbitrary periodic current waveform can be designed, with both positive and negative current portions, with a period short with respect to the nozzle movement speed, the shape of which is dynamically changed along the electroforming path based on the previously measured surface topography.

The control assembly of FIG. 4 can also be used for calibration of the system 10 as disclosed above.

The control assembly of FIG. 4, regardless from its use in an electrodeposition system, provides also a simple method to locally probe the surface topography of any metal structure electrically connected to the cathode, where the resistivity between the structure itself and the cathode (the target substrate) can be considered constant regardless of the jet impact position.

The role of the cathode and anode can be reversed or, to avoid deposition/removal of material during the probing, a bipolar waveform with zero current average can be employed.

While the above-disclosed monitoring technique of the deposition profile is the preferred embodiment of the invention, as it is simple and directly integrated in the electroforming process, any other methodology providing an in-line and in-process real-time measurement of the deposited material topography can be employed in connection with a closed loop control of the deposition current.

Naturally, the principle of the invention remaining unchanged, the embodiments and the constructional details may vary widely from those described and illustrated purely by way of non-limiting example, without thereby departing from the scope of the invention as defined in the appended claims.

What is claimed is:

1. A method for manufacturing a three-dimensional structure by a process of localized electroforming of at least one material from an electrolytic solution of said at least one material, said method comprising:
    emitting a jet of the electrolytic solution from a nozzle associated with a control electrode towards at least one impacting area of an electrically conductive target substrate, wherein said electrically conductive target substrate is a base substrate or an unfinished three-dimensional structure under formation over the base substrate;
    controlling a relative position of said jet of the electrolytic solution with respect to the electrically conductive target substrate in such a way as to follow a predetermined electroforming path with respect to a reference system of said three-dimensional structure, as a function of a predetermined configuration pattern of said three-dimensional structure; and
    controlling a potential difference between said control electrode and the electrically conductive target substrate or, alternatively, an ion current intensity through the jet of the electrolytic solution between said control electrode and the electrically conductive target substrate, wherein a potential difference having a first polarity or an ion current flowing in a first direction result in a deposition of material from said electrolytic solution on the electrically conductive target substrate and a potential difference having an inverse polarity or an ion current flowing in an opposite direction result in material removal from the electrically conductive target substrate;
    wherein the process of localized electroforming of the at least one material onto the electrically conductive target substrate occurs in a plurality of electroforming cycles, each electroforming cycle including deposition or removal of material at predetermined impacting areas of the electrically conductive target substrate,
    said method further comprising, during an electroforming cycle or between two electroforming cycles, performing a scanning step comprising:
        injecting a predetermined probing electrical current into an electroforming circuit including said control electrode, said jet of the electrolytic solution and said electrically conductive target substrate;
        detecting the potential difference established across said electroforming circuit as a function of a position of the jet of the electrolytic solution along said predetermined electroforming path;
        determining a present elevation of the three-dimensional structure under formation over the base substrate as a function of the detected potential difference;
        comparing the present elevation of the three-dimensional structure under formation with a predetermined design elevation associated with a present the electroforming cycle when the scanning step is performed during the electroforming cycle or with a last electroforming cycle preceding the scanning step when the scanning step is performed between two electroforming cycles, and calculating a corresponding elevation difference; and
        at a subsequent electroforming cycle, modulating at least one of a plurality of predetermined physical parameters of the localized electroforming process affecting deposition or removal rate of material on the electrically conductive target substrate along said predetermined electroforming path as a function of the position of the jet of the electrolytic solution along said predetermined electroforming path and the calculated elevation difference at said position.

2. The method of claim 1, wherein modulating at least one of a plurality of predetermined physical parameters of the localized electroforming process affecting deposition or removal rate of material on the electrically conductive target substrate comprises at least one of modulating the potential difference between said control electrode and said electrically conductive target substrate, modulating an amplitude of a direct ion current through the jet of the electrolytic solution, modulating a duty cycle of a pulse-width-modulated ion current through the jet of the electrolytic solution, modulating speed of movement of the jet of the electrolytic solution along said predetermined electroforming path, modulating an elevation of said nozzle over the electrically conductive target substrate, modulating hydrodynamic characteristics of the jet of the electrolytic solution, and changing chemical composition of the electrolytic solution.

3. The method of claim 1, wherein determining the present elevation of the three-dimensional structure under formation over the base substrate as a function of the detected potential difference includes determining an overall electric resistance of a present electroforming circuit based on the injected predetermined probing electrical current and the detected potential difference and comparing the overall electric resistance of the present electroforming circuit with a reference overall electric resistance of the electroforming circuit measured at a preliminary calibration step, a difference between the overall electric resistance of the present electroforming circuit with the reference overall electric resistance of the electroforming circuit measured at a preliminary calibration step depending upon a length of the jet of the electrolytic solution between the control electrode and a present impacting area on the electrically conductive target substrate.

4. The method of claim 3, wherein said preliminary calibration step comprises:
    emitting the jet of the electrolytic solution from the nozzle associated with the control electrode towards a reference region of the electrically conductive target substrate;
    injecting a predetermined constant electrical calibration current into the electroforming circuit including said control electrode, said jet of the electrolytic solution and said electrically conductive target substrate;
    on a predetermined calibration time scale measuring a variation of the potential difference established across said electroforming circuit as a function of a length variation of the jet of the electrolytic solution controlled by changing a relative distance between said control electrode or said nozzle and the electrically conductive target substrate along a direction orthogonal to the electrically conductive target substrate; and
    associating the length variation of the jet of the electrolytic solution to the reference overall electric resistance of the electroforming circuit derived as a function of the measured potential difference and the injected predetermined constant electrical calibration current.

5. The method of claim 1, wherein the predetermined probing electrical current is a constant current.

6. The method of claim 1, wherein the predetermined probing electrical current has a bipolar waveform with zero current average.

7. The method of claim 1, wherein the predetermined probing electrical current is a variable current and a relationship between current and voltage drop at an interface between the control electrode and the electrolytic solution and between the electrolytic solution and the electrically conductive target substrate is known.

8. The method of claim 1, further comprising controlling a relative bi-dimensional position of said jet of the electrolytic solution over the electrically conductive target substrate in time, and controlling a target substrate scanning speed by said jet of the electrolytic solution as a function of said relative bi-dimensional position and of the predetermined configuration pattern of said three-dimensional structure.

\* \* \* \* \*